US012722164B2

(12) United States Patent
Odinokov

(10) Patent No.: US 12,722,164 B2
(45) Date of Patent: Sep. 1, 2026

(54) METHOD FOR A LIQUID JET FORMATION AND EJECTION AND DEVICES FOR USE IN SAID METHOD

(71) Applicant: Sergey Odinokov, Vilnius (LT)

(72) Inventor: Sergey Odinokov, Vilnius (LT)

(73) Assignee: Sergey Odinokov, Vilnius (LT)

( * ) Notice: Subject to any disclaimer, the term of this patent is extended or adjusted under 35 U.S.C. 154(b) by 281 days.

(21) Appl. No.: 18/283,864

(22) PCT Filed: Mar. 22, 2022

(86) PCT No.: PCT/IB2022/052615
§ 371 (c)(1),
(2) Date: Sep. 25, 2023

(87) PCT Pub. No.: WO2022/201030
PCT Pub. Date: Sep. 29, 2022

(65) Prior Publication Data

US 2024/0165639 A1 May 23, 2024

(30) Foreign Application Priority Data

Mar. 25, 2021 (LT) ........................................ 2021512

(51) Int. Cl.
*B05B 1/08* (2006.01)
*B05B 1/32* (2006.01)
(Continued)

(52) U.S. Cl.
CPC .............. *B05B 1/083* (2013.01); *B05B 1/326* (2013.01); *B05B 1/3402* (2018.08); *B05B 12/04* (2013.01)

(58) Field of Classification Search
CPC ....... B05B 1/083; B05B 1/3402; B05B 1/326; B05B 12/04; B05B 17/08; B05B 1/1636;
(Continued)

(56) References Cited

U.S. PATENT DOCUMENTS 3,414,196 A * 12/1968 Legeza ................. B05B 1/1663
239/106
5,160,086 A * 11/1992 Kuykendal ............... B05B 1/10
239/18
(Continued)

FOREIGN PATENT DOCUMENTS

ES 2736290 B1 12/2020
WO 2008/062398 A1 5/2008

OTHER PUBLICATIONS

International Search Report and Written Opinion of International Application No. PCT/IB2022/052615 mailed Jun. 8, 2022, 12 pgs.

*Primary Examiner* — Steven M Cernoch
(74) *Attorney, Agent, or Firm* — Notaro, Michalos & Zaccaria P.C.

(57) ABSTRACT

The invention is the complex technical solution covering the method for the continuous liquid jet formation and ejection, the generator for ejection such jet and the special shutter for blocking the jet in the generator and designed for use in the method. A distinctive feature is the switching between the two jets, which causes neither a stop of the liquid flow in the generator nor fluctuations in the liquid pressure in it, when one jet is drained to the source of liquid. The invention is intended for organizing the process of metered ejection of free continuous liquid jets, for example, liquid chemical treatment agents, without loss of liquid outside its trajectory.

20 Claims, 6 Drawing Sheets

(51) Int. Cl.
*B05B 1/34* (2006.01)
*B05B 12/04* (2006.01)

(58) Field of Classification Search
CPC ... B05B 1/1627; B05B 1/1681; B05B 1/3026; F16K 3/24; F16K 11/076
See application file for complete search history.

(56) References Cited

U.S. PATENT DOCUMENTS

| | | | | |
|---|---|---|---|---|
| 5,979,791 | A | 11/1999 | Kuykendal et al. | |
| 6,641,056 | B2 * | 11/2003 | Kuykendal | B05B 17/08 239/18 |
| 8,215,569 | B2 * | 7/2012 | Johnson | B05B 17/06 239/18 |
| 10,512,921 | B2 * | 12/2019 | Norasak | B41J 2/16508 |
| 2010/0155498 | A1 | 6/2010 | Hagaman | |
| 2014/0263754 | A1 * | 9/2014 | Nushart | B05B 7/32 239/442 |

* cited by examiner

METHOD FOR A LIQUID JET FORMATION AND EJECTION AND DEVICES FOR USE IN SAID METHOD

CROSS-REFERENCE TO RELATED APPLICATIONS

This application is a national phase entry under 35 U.S.C. § 371 of International Application No. PCT/IB2022/0052615, filed on Mar. 22, 2022, which claims the benefit of Lithuanian Patent Application No. 2021 512, filed on Mar. 25, 2021. The contents of these applications are hereby incorporated by reference herein in their entireties.

FIELD OF THE INVENTION

The invention relates to methods and devices for formation and ejection of continuous free jet of liquid along a ballistic trajectory during the required time interval.

The invention can be used for targeted delivery of doses of single- or multicomponent liquids, suspensions, sols and liquid gels in precision farming and animal husbandry systems, and can also find application in public and entertainment water installations, for example, fountains, active games and amusement parks.

BACKGROUND OF THE INVENTION

In agriculture, namely in precision farming and animal husbandry, there is a need to deliver liquid to the processing sites by methods other than spraying, i.e., without the use of aerosol or spray. Such a demand arises in connection with the tendency to increase the environmental friendliness of the treatment process simultaneously with the trend to reduce the dose of the liquid required for the treatment. An example of a market segment in which such a need is particularly pronounced is the treatment of fruit trees with poisoned baits, in which the sticky liquid must be delivered exactly to the tree trunk or large branches, and not get on the leaves and ripening fruits.

A good alternative to spraying is the use of continuous, optimally, laminar liquid jets. Continuous, and especially laminar, jets are resistant to gusts of not strong wind, have excellent repeatability of the shape and trajectory from ejection to ejection and are guaranteed to deliver the liquid to the desired point in space without any significant deflection. The laminar jet does not suck in air and does not form an aerosol, it looks like a continuous homogeneous solid body. For example, a laminar jet ejected upwards at an angle to the horizon resembles a parabolically curved rod with the top up, retains its continuity at a considerable distance from the source, at least to the upper point of the trajectory, and often in its descending part below the level of the outlet of the laminar jet generator. The laminar jet, ejected upwards at an angle to the horizon, allows for the delivery of liquid along a ballistic trajectory onto or into objects that are far horizontally from the jet source. The interruption of the continuous jet ejection forms a segment of a liquid rod of a known section and length, and, consequently, volume, freely flying in the air.

Sources of laminar jets, often called laminar flow generators, as well as jet interrupters for them are known and used, for example, in fountains and are described in a number of patents: U.S. Pat. No. 8,177,141B2, US2011073670A1, US2016121357A1, U.S. Pat. No. 8,333,331B1, U.S. Pat. No. 4,795,092A, EP1153663A2, US2003010836A1, U.S. Pat. No. 9,744,471B1, JPH09314009A, U.S. Pat. Nos. 5,641,120A, 5,927,320A, 6,676,031B2, 6,752,373B1 and others.

The vast majority of known solutions are focused on the use of water and, accordingly, have not been worked out from the point of view of minimizing liquid losses outside the main trajectory of the generated jet during transients because water is usually not a source of pollution.

To interrupt the jet in most known solutions, an interrupter, external for the generator, is used, which blocks already formed and ejected by the generator jet with a shutter, for example, RU197224U1, or deflects the jet with a flow of compressed air or another liquid jet, for example, U.S. Pat. No. 4,889,283A. The deflected or blocked jet scatters to the sides, which requires an additional sealed housing around the interrupter to collect such liquid and return it back to the liquid source. The mechanisms inside such housing and the interrupter itself are subject to contamination with a liquid other than water.

There are solutions, for example, U.S. Pat. No. 9,744,471B1 and US2017020087A1, which interrupt the jet by stopping the liquid supply to the jet generator. However, the generator and the liquid in it have some inertia, which leads to long transients until the generator is completely degassed, as well as to the complete stabilization of the liquid flow in it.

There are known solutions, for example, U.S. Pat. No. 6,179,228, in which an external shutter closes the outlet of the generator and thereby either allows the ejection of liquid or not. Such solution is less suitable for agriculture, since it requires an additional external jet interrupter with an additional sealed housing around it to collect the liquid of the interrupted jet, which will be polluted by the liquid scattered inside it. Also, the overlapping is optimal neither in terms of speed nor in terms of the profile of the jet section interruption.

Also, there are known solutions, for example, U.S. Pat. No. 5,979,791A, in which an internal shutter closes the outlet of the generator and thereby either allows the ejection of liquid or not. Such solution is more suitable for use in agriculture, since it does not require an additional external jet interrupter with an additional sealed housing around it to collect the liquid of the interrupted jet. However, the blockage of the outlet stops the flow of liquid inside the generator and leads to increase in pressure in it, respectively, the next time the outlet is opened, a long transient process will occur with the liquid ejection at pressure that exceeds the value of stationary operation pressure, giving a pulse to the liquid and bringing the liquid flow to the required stationary condition. All these negative factors lead to a deviation of the liquid from the trajectory of a stationary stable jet.

SUMMARY OF THE INVENTION

The proposed technical solution is intended to solve such a problem as ensuring the formation and ejection of a continuous free liquid jet along a ballistic trajectory during the required time interval with minimal or no liquid losses outside the jet trajectory.

The technical objective of the invention is to create a reliable method and a device or devices for use in such method for ensuring the formation and ejection of a continuous free liquid jet along a ballistic trajectory for the required time interval with minimal or no liquid losses outside the trajectory.

To overcome the above mentioned problems and to solve the technical objective, a complex technical solution is proposed, characterized by a set of features set out in the Claims.

Method for a liquid jet formation and ejection according to present invention is comprising:

providing means for continuous jet formation and ejection, such as a jet ejection generator, comprising a chamber with an outlet surface distanced from a liquid inlet;

placing and orienting said chamber on its supporting basis;

providing the generator with liquid from a source of liquid;

reducing turbulence and/or aligning of liquid flow within the generator between liquid input into the chamber from the liquid inlet and a jet output from the outlet on the outlet surface of the chamber with forming a continuous jet;

blocking said outlet by moving a liquid output shutter from the position of the completely open outlet to the position of the completely closed outlet;

The proposed method is characterized by:

providing a possibility of forming a second continuous jet by equipping the outlet surface of the chamber with two adjacent and geometrically equal outlets;

defining positions of the shutter in such a way that two end positions and a sequence of transitional positions are provided for the shutter, wherein in any end position the lumen of one outlet is completely open, and the lumen of another outlet is completely closed; while in any transitional position the lumens of both outlets are partially open with the total area of the open lumens of the first and the second outlets being constant and equal to the lumen area of one of the completely open outlets;

ensuring rapid movement of the shutter from one end position to another one through a sequence of transitional positions by means of controlled drive together with the coupler when a control signal is given or its supply is stopped; and placing the chamber, providing positions in which said outlets are located below the level of the liquid inlet, when the chamber is directed outlets downwards.

The outlets are located in the central area of the outlet surface of the chamber and made round, conically expanding towards the jet ejection, wherein the conical narrowing facing inside the chamber is forming a sharp edge of the outlet, and the jets formed by them are jets without interference.

In an embodiment of the proposed method, the outlet surface of the chamber is positioned perpendicular to the liquid flow in the chamber. In one of the optimal embodiments, the outlet surface of the chamber is made in the form of a removable lid, optionally, with a controlled drive and/or the coupler installed on the lid.

The outlet surface of the chamber is equipped from the outside with means for draining liquid, ejected from the second outlet in the open or any transitional position, in direction, other than direction of the liquid jet ejection from the first outlet in open position. Said means for drainage are made in the form of a junction pipe, the inner section of which is completely enclosing a section of the second outlet, and which is hermetically connected to the second outlet from the outer side of the outlet surface of the chamber; wherein the drained liquid and the junction pipe do not interfere with the liquid jet ejected from the first outlet in open position.

For draining the liquid to the source of liquid, wherefrom the liquid is supplied to the chamber inlet, the outlets are located above the maximum operating level of the liquid in the source of liquid at any placement of the chamber.

Reduction of turbulence and/or aligning liquid flow are ensured by installing special means in such a way, that any path of the liquid from the inlet to each outlet is passing said means, optionally, configured with the possibility of replacing them and/or cleaning them from liquid residues.

In proposed method, the shutter, ensuring the constancy of the total area of open lumens of said outlets, is made in the form of a streamlined flat shutter adjacent to the outlet surface of the chamber, wherein the streamlined flat shutter is comprising two overlapping areas, directly partially or completely overlapping the corresponding outlets, one overlapping area for each outlet, wherein each overlapping area is corresponding to a blind region on the shutter, providing a completely open lumen of the corresponding outlet in one end position of the shutter and completely closed lumen of the same outlet in the other end position of the shutter. Sliding of said flat shutter along the outlet surface of the chamber from the inside and a constant volume of its part immersed in the liquid are provided.

For an embodiment of the method with shutter moving from one end position to another one by translational motion, the shutter is configured in such a way that its overlapping areas form a special shape of two complementary fragments of a continuous strip with rounded corners.

For an embodiment of the method with shutter transitioning from one end position to the another one by pivoting about the axis equidistant from outlets centers, the shutter is configured in such a way, that overlapping areas form a special shape of two complementary fragments of a ring segment with rounded corners, wherein the ring segment is circumscribed around the projections of both outlets.

An important distinctness of the proposed solution is that said shutter is configured from geometrically intersecting overlapping areas formed from complementing each other fragments of a dissected by a secant continuous strip or an annular segment, superimposing said overlapping areas and advancing them relative to each other to a position in which the edges formed by the secant become lateral.

Another object of the invention is a generator for a liquid jet formation and ejection, designed to be used in the above proposed method, comprising a chamber, wherein:

liquid inlet is distanced from the outlet surface with the outlet located on it;

means for reducing turbulence and/or aligning liquid flow are located inside the chamber between the liquid inlet and the outlet surface;

outlet surface is provided with the shutter for the outlet, wherein in closed position of said shutter the lumen of the outlet is completely closed, while in open position—the lumen of the outlet is completely open;

controlled drive is connected by the coupler with the shutter; and the chamber inlet is hydraulically connected to the source of liquid.

The novelty of the disclosed generator is that:

the outlet surface of the chamber is equipped with two adjacent and geometrically equal outlets;

the shutter is configured for transition from one end position to another one through a sequence of transitional positions, providing minimal fluctuations in the liquid pressure in the chamber during the transition, and:

in any end position the lumen of one outlet is completely open, while the lumen of another outlet is completely closed;

in each transitional position, the lumens of both outlets are partially open, the total area of the open lumens of the first and the second outlets being constant and equal to the lumen area of one of completely open outlets; and controlled drive together with the coupler are configured to ensure quick transition of the shutter from one end position to another one when the control signal is given and/or stopped.

In an embodiment of the proposed generator, the outlets are round openings forming jets, being made conically expanding in the direction of the jet ejection, wherein the conical narrowing facing inside the chamber forms a sharp edge of the outlet.

The outlets are located in central area of the outlet surface, and the jets formed by them are jets without interference and, optionally, are laminar jets.

In an embodiment of the proposed solution, the outlet surface of the chamber is made in the form of a removable lid, optionally with the controlled drive and/or the coupler installed on the lid.

The outlet surface of the chamber is equipped from the outside with the means for draining liquid, ejected from the second outlet in the open or each transitional position, in direction other than direction of the liquid jet ejection from the first outlet in the open position, in such a way, that the drained liquid does not interfere with liquid jet ejected from the first outlet in open position.

Said means for draining are made as, for example, a junction pipe hermetically coupled with second outlet from the outer side of the outlet surface of chamber, the inner section of which is completely enclosing the section of the second outlet; wherein the drained liquid and the junction pipe do not interfere with the liquid jet ejected from the first outlet in the open position.

For draining liquid to the source of liquid, from which liquid is supplied to the inlet of the chamber, the location of the outlets is provided above the maximum operating level of the liquid in the source of liquid at any placement of the chamber.

The means for reducing turbulence and/or aligning liquid flow are installed in such a way, that any path of the liquid from the inlet to each of the outlets is passing said means, optionally, configured with the possibility of their replacement and/or cleaning from liquid residues.

In an embodiment of the proposed generator, the outlet surface of the chamber is perpendicular to the liquid flow within the chamber.

In the optimal embodiment, the chamber has a cylindrical shape with diameter at least 8 times more than diameter of any of the outlets; the outlet surface is one of the end faces of the chamber, and the inlet is located on the opposite end face or on the side surface adjacent to it.

The key object of the technical solution is a shutter for outlets for use in the chamber of generator as described above, designed for the implementation of the proposed method. The shutter according to the invention is configured to ensure the constancy of the total area of open lumens of outlets of the chamber, being made in form of the streamlined flat shutter adjoined to the outlet surface of the chamber, wherein the streamlined flat shutter is comprising two overlapping areas, directly partially or completely overlapping the corresponding outlets, one overlapping area for each outlet, wherein each overlapping area is corresponding to a blind region on the shutter, providing completely open lumen of the corresponding outlet at one end position of the shutter and completely closed lumen of the same outlet at the another end position of the shutter, and is characterized by size R equal to the radius of the completely open lumen of one of the outlets.

In the optimal embodiment, said flat shutter is adjoining the outlet surface of the chamber from the inside and having a constant volume of the part immersed into the liquid. The shutter can be made of a thin plate of waterproof tough material, preferably, stainless steel.

The junction with the coupler in proposed shutter is brought out from the overlapping areas not closer than distance of 4R to the nearest outlet.

In an embodiment of the shutter, configured for transition from one end position to another one by translational motion, the overlapping areas of the shutter, are comprising a special shape of two complementary fragments of the continuous strip segment with rounded corners. The width of the strip is equal to 2R, the radius of the corner rounding of the segment is equal to R and the segment length is at least 4R.

In an embodiment of the shutter, configured with the transition from one end position to the another one by pivoting around the axis, equidistant from the outlets' centers, the overlapping areas are comprising a special shape of two complementary fragments of the ring segment with rounded corners, wherein the ring segment is circumscribed around the projections of both outlets. The width of the ring segment is equal to 2R, the radius of the corner rounding of the ring segment is equal to R, and the center line of the ring segment is located on an imaginary circle passing through the outlets centers and centered on the pivoting axis of the shutter.

The shutter is configured on the basis of geometrically intersecting overlapping areas. Preferred embodiments of the shutter are based on geometrically intersecting overlapping areas formed from complementing each other fragments of a dissected by a secant continuous strip or an annular segment, by superimposing said overlapping areas and then advancing them relative to each other to a position in which the edges formed by the secant become lateral.

In one of the optimal embodiments of the shutter said secant is the circle, which center lies on the central line of the strip, which diameter is at least 2R, and which is intersecting the center line not closer than 2R from each end of the central line of the strip segment, as shown in FIGS. 22-23.

The proposed technical solution is complex and united by a single inventive idea, wherein the design features of the shutter determine a novel method for liquid jet formation and ejection and features of the generator designed to to be used in such method.

BRIEF DESCRIPTION OF DRAWINGS

The technical solution as proposed is explained by drawings illustrating the spirit of invention, but not limiting the scope of protection of the invention.

FIGS. from 11 to 12. An example of configuration of the shutter 11, using the overlapping areas 18 and 19, configured according to FIG. 10.

FIGS. from 13 to 14. An example of the alternative configuration of shutter 11, using the overlapping areas 18 and 19, configured according to FIG. 10.

FIGS. from 16 to 18. An example of the shutter 11 configuration, using the overlapping areas 18 and 19, configured according to FIG. 15.

FIGS. from 19 to 21. An example of the alternative shutter 11 configuration, using the overlapping areas 18 and 19, configured according to FIG. 15.

DETAILED DESCRIPTION AND MODES OF EMBODIMENTS OF THE INVENTION

The embodiments of the invention are examples illustrating the invention, but not limiting the scope of protection.

Figure 1:
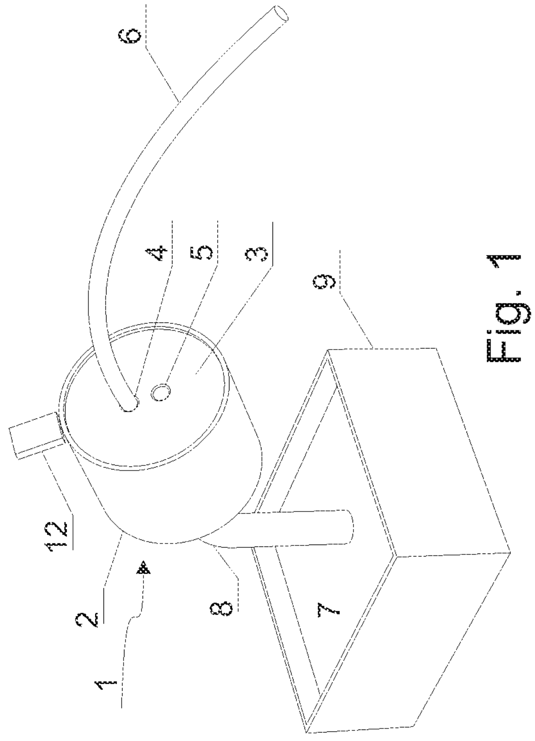
FIG. 1 shows a general view of the generator 1 ejecting continuous jet 6 from the first outlet 4. The shutter 11 is in the open position.

FIG. 1 shows generator 1 consisting of hollow chamber 2, optimally, of cylindrical shape, with outlet surface 3, optimally, flat, and geometrically equal the first outlet 4 and the second outlet 5 located on said outlet surface adjacent to each other. In the state shown in FIG. 1, the generator ejects a continuous, optimally, laminar, jet 6 of liquid from the first outlet 4. Liquid 7 is supplied to the inlet 8 of the generator 1 from the liquid source 9.

Figure 6:
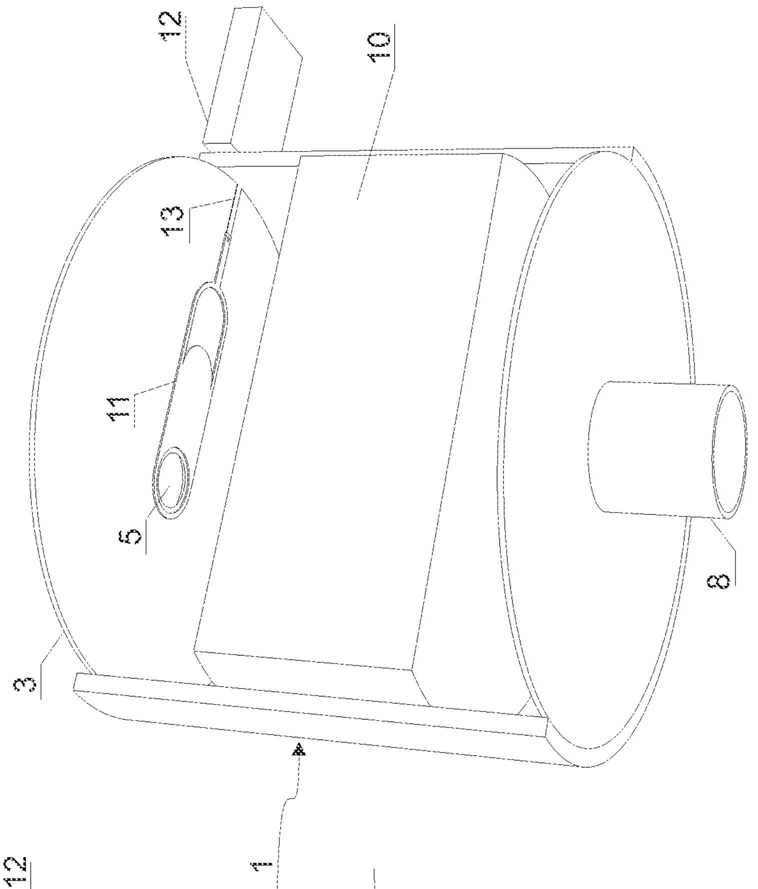
FIG. 6. Isometric view of the hollow chamber 2 and the corresponding components of the generator 1. Shutter 11 and coupler 13 are shown. The hollow chamber 2 is shown with a partially removed side surface.

FIG. 6 shows the generator 1 with the side surface partially removed for clarity. Between the inlet 8 and the outlet surface 3, means 10 for reducing liquid turbulence and/or aligning liquid flow along the course of its flow from the liquid inlet 8 to the outlet 4 or 5 are located. In the optimal embodiment, the means 10 for reducing liquid turbulence and/or aligning liquid flow are located inside the hollow chamber 2 so that any path of the liquid from the inlet 8 to the outlets 4 and 5 passes through these means, and the means themselves are replaceable and adapted for washing (cleaning) from liquid residues. An example of means 10 for reducing liquid turbulence and/or aligning liquid flow is a stack of hemispherical filters made of a grid with small cells concave respective to the outlets 4 and 5. The outlet surface 3 is provided with the shutter 11 for outlets 4 and 5. The shutter 11 is connected to the controlled drive 12 by the coupler 13. The shutter 11 is provided with the end open position, end closed position and a sequence of transitional positions between the end positions, and in the end open position, the lumen of the first outlet 4 is completely open, and the lumen of the second outlet 5 is completely closed, and in the end closed position, on the contrary, the lumen of the first outlet 4 is completely closed, and the lumen of the second outlet 5 is completely open; in each transitional position, the lumens of both outlets 4 and 5 are partially open, and the total area of the open lumen of the first and second outlets 4 and 5 is constant and equal to the lumen area of one of the fully open outlets 4 or 5. The constancy of the total area of lumens ensures a constant flow of liquid in the generator 1 with minimal fluctuations in liquid pressure during switching. The non-stop flow of liquid in the generator 1, regardless of the position of the shutter 11, is a distinctive feature of this solution and allows almost instantly form the continuous liquid jet 6 on an outlet 4 or 5 with stable characteristics, when quickly switching from one end position to another one, which allows ejecting the free, optimally, laminar, liquid jet 6 along a given ballistic trajectory with almost no losses outside the trajectory.

Accordingly, the shutter 11 is configured with the possibility of alternately overlapping one of the two outlets 4 or 5 in their end positions; and the controlled drive 12 together with the coupler 13 are configured to ensure a rapid movement of the shutter 11 from one end position to another one through a sequence of transitional states when the control signal is given or released.

The generator 1 can be directed in any spatial direction, for example, with the inlet 8 above the levels of the outlets 4 and 5. For optimal operation, the generator 1 is positioned in space so that the outlets 4 and 5 are above the working level of the liquid 7 in the liquid source 9.

Figure 5:
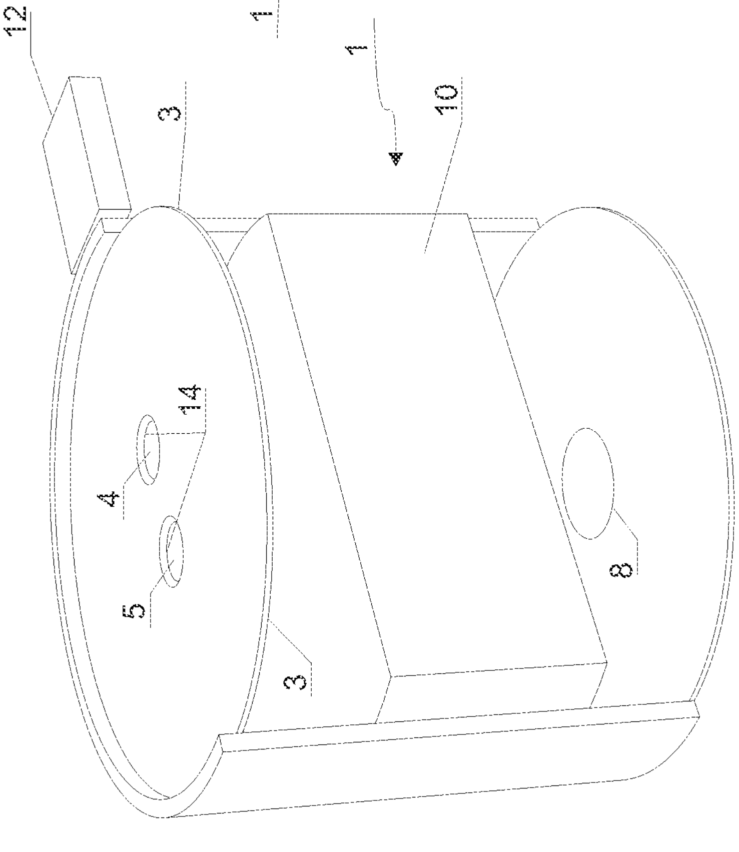
FIG. 5. Isometric view of the hollow chamber 2 and the corresponding components of the generator 1. The sharp edges 14 of outlets 4 and 5 are shown. The hollow chamber 2 is shown with a partially removed side surface.
Figure 8:
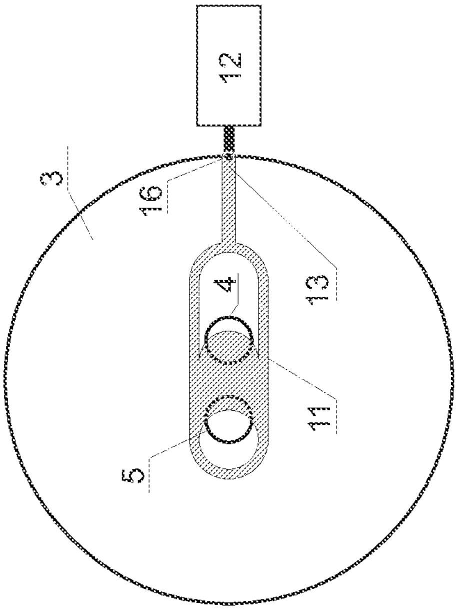
FIG. 8. View of the outlet surface from the side of the shutter 11, which is in a transitional position.
Figure 7:
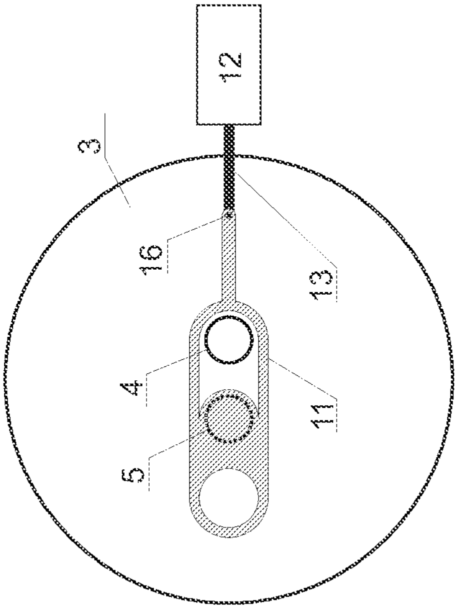
FIG. 7. View of the outlet surface from the side of the shutter 11, which is in the open position.
Figure 9:
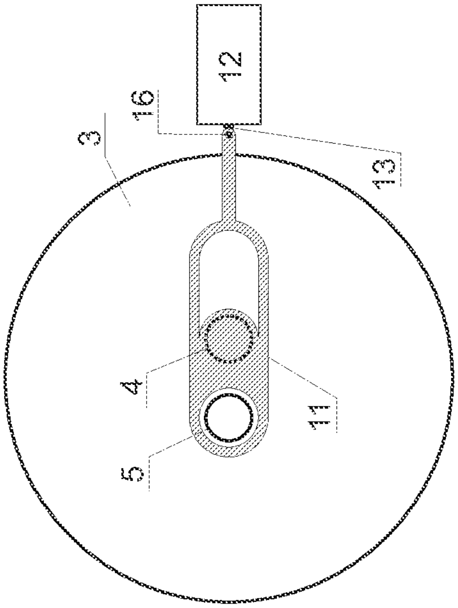
FIG. 9. View of the outlet surface from the side of the shutter 11, which is in the closed position.

In the standard embodiment, the outlets 4 and 5 are located in the central area of the outlet surface, they are round and are made conically expanding towards the jet 6 outlet, and the narrowing of each of the outlet facing into the hollow chamber 2 forms a sharp edge 14, as shown in FIG. 5.

Figure 2:
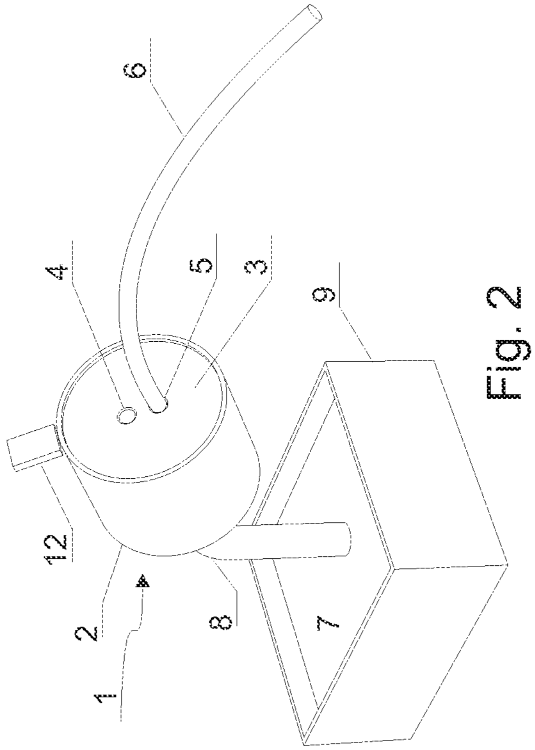
FIG. 2 shows a general view of the generator 1 ejecting continuous jet 6 from the second outlet 5. The shutter 11 is in the closed position.
Figure 3:
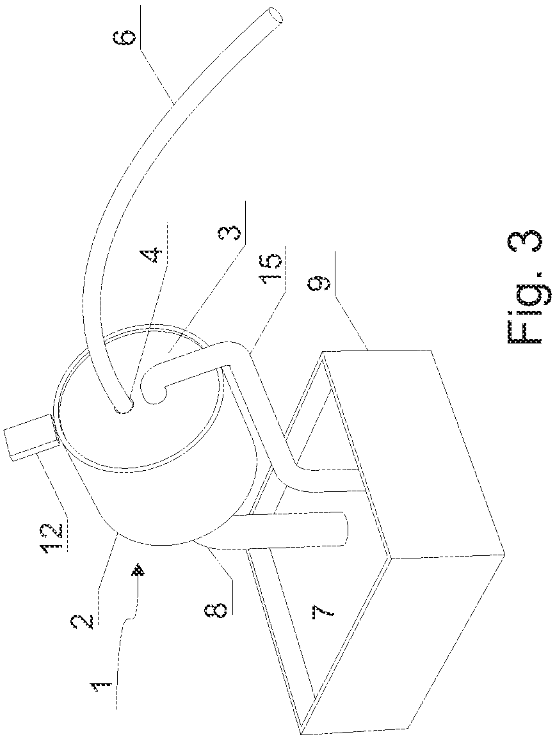
FIG. 3 shows a general view of the generator 1 ejecting a continuous jet 6 from the first outlet 4 with a drainage junction pipe 15 opposite the outlet 5. The shutter 11 is in the open position.
Figure 4:
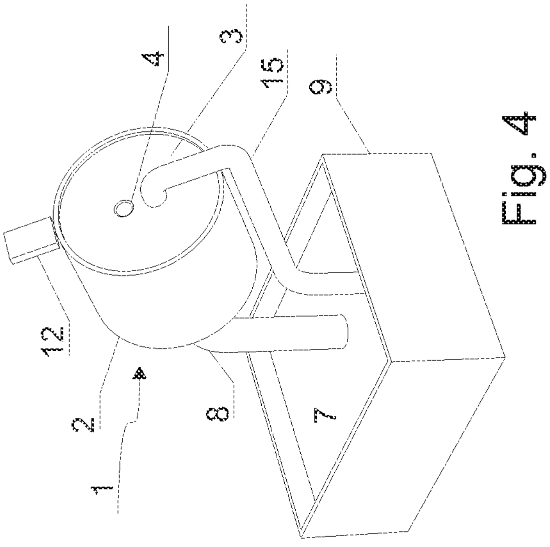
FIG. 4 shows a general view of the generator 1 ejecting a jet into the drainage junction pipe 15 opposite the outlet 5. The shutter 11 is in the closed position.

Since the outlets 4 and 5 are geometrically identical and located close to each other, the jets 6 formed on them in different end positions of the shutter 11 (see FIG. 1 and FIG. 2) will have geometrically identical ballistic trajectories shifted relative to each other by a vector connecting the centers of the outlets 4 and 5. In embodiments using two jets 6, the generator 1 is located and direct in space so that the jets 6 do not interfere (do not intersect) with each other at least during the transition of the shutter 11 from one end position to another one. For other practical applications, one of the jets 6 is drained to the side and, optimally, returned to the liquid source 9. For example, a jet 6 is ejected through the second outlet 5. To drainage the jet 6 ejecting by the outlet 5, the outlet surface 3 of the hollow chamber 2 is provided with means 15 of liquid drainage ejected from the second outlet 5 in the open or transitional position, in a direction different from the direction of the liquid jet 6 ejection from the first outlet 4 in the open position, so that the drained liquid does not interfere with the liquid jet 6 ejected from the first outlet 4 in the open position. The optimal embodiment for the means for liquid drainage is the junction pipe 15, which is hermetically connected to the second outlet 5 from the outside of the outlet surface 3 of the chamber. The internal section of the junction pipe 15 completely includes the section of the second outlet 5, and the junction pipe 15 does not interfere with the liquid jet 6 ejected from the first outlet 4 in the open position. Optimally, the junction pipe drains the liquid to the liquid source 9. That is why it is optimal to position the generator 1 in space and orient it so that the outlets 4 and 5 are above the working level of the liquid in the liquid source 9.

In the standard embodiment of the generator 1, its chamber 2 is a hollow cylinder with a diameter at least 8 times larger than the diameter of the fully open lumen of one of the outlets 4 or 5, the outlet surface 3 is the end of the chamber 2 and is perpendicular to the flow of liquid in it, and the inlet 8 is located on the opposite end or on the side surface next to it. For ease of maintenance, the outlet surface 3 is made in the form of a removable lid with an optional controlled drive 12 and/or a coupler 13 installed on it.

The controlled drive 12 can be of any suitable type, for example, one or more electromagnetic solenoids, servo, pneumatic drives or electric motors. The controlled drives 12, which cause minimal mechanical vibrations of the generator, are optimal. The controlled drive 12 can be installed on the hollow chamber 2 either inside it or outside it, including installation on the outlet surface 3, as well as outside the generator 1.

The controlled drive 12 can provide the end fully closed position of the shutter 11 in its inactive state and transfer the shutter 11 to the end fully open state in its active state when an opening control signal is given to it, at least for the time necessary to transfer the shutter 11 from the end fully closed position to the end fully open position.

After the opening control signal to the controlled drive 12 is released, the controlled drive 12 automatically (independently) returns to the inactive state, transferring the shutter 11 from the end fully open position to the end fully closed position. In an alternative embodiment, in order to transfer the shutter 11 from the end fully open position to the end fully closed position, a closing control signal must be given to the controlled drive 12 for at least the time necessary to transfer the shutter 11 from the open position to the closed one. The controlled drive 12 can have one universal input for control signals, or two separate ones. The drives 12 based on electromagnetic solenoids, electric motors or electric servo drives are controlled by electrical signals, and pneumatic drives are controlled by compressed gas, usually air. The duration of the activation time can be adjusted or determined by the sensors of the end positions of the shutter 11, connected either to the shutter 11, coupler 13 or the controlled drive 12. End position sensors can be of any type, but non-contact sensors are optimal, for example, optical interrupters, induction sensors or Hall effect sensors.

The coupler 13 is designed to transfer the mechanical action from the controlled drive 12 to the shutter 11 in order to quickly move it from one end position to another one. The coupler 13 can convert the translational motion of the controlled drive 12 into the pivoting motion of the shutter 11 or the pivoting motion of the controlled drive 12 into the translational motion of the shutter 11, or transmit the action without converting it.

The junction 16 of the coupler 13 with the shutter 11, located on the inner side of the outlet surface 3, is optimally located no closer than at a distance of 2-3 diameters of the fully open lumen of one of the outlets 4 or 5 from the nearest outlet 4 or 5.

In the standard embodiment, the shutter 11 is made in the form of a streamlined shutter 11 adjacent to the outlet surface 3 of the hollow chamber 2. For example, FIG. 6 shows the shutter 11 located on the inside of the outlet surface 3. In some embodiments, the shutter 11 is made of a thin plate of waterproof tough material, optimally, stainless steel. The generator 1 may also include possible means for attaching the shutter 11 to the outlet surface 3, means for pressing the shutter 11 to the outlet surface 3 and/or means for ensuring sealing of the shutter 11 to the outlet surface 3 at least in the end positions of the shutter 11. These means can have a different design that meets the purpose of the generator 1 in specific applications.

The shutter 11 can be located both on the inside and on the outside of the outlet surface 3. With an internal location, the liquid pressure inside the hollow chamber 2 can be used to ensure or strengthen the tightness of the shutter 11 to the outlet surface 3; in this case, the shutter is optimally configured so that the volume of its part immersed in the liquid is constant. With the external location of the shutter 11, neither it nor the associated components and mechanisms of the generator 1 affect the characteristics of the liquid flow inside the hollow chamber 2. The choice of the internal or external location of the shutter 11 on the outlet surface 3 is made taking into account the specifics of a particular implementation or application.

On the shutter 11, two continuous overlapping areas 17 are distinguished by directly partially or completely overlapping the corresponding outlets 4 and 5. The overlapping area 17 of the shutter 11 directly provides a fully open lumen of the corresponding outlet 4 or 5 in one end position of the shutter 11 and a fully closed lumen of this outlet in the other end position of the shutter 11. Overlapping areas 17 may intersect or overlap one another. The overlapping areas 17 is a real continuous area on the shutter 11 and is characterized by size R equal to the radius of the fully open lumen of one of the outlets.

For the shutter 11, which performs only pivoting motion when moving from one end position to another, the overlapping areas 17 have special shapes that exactly complement each other to a ring segment with a width equal to 2R, with rounded corners 28 with a radius of R, where two circles with radii R can be placed on the ring segment without intersection, and the central line is an arc of a circle passing through the axes of the outlets and centered on the pivot axis of the shutter 11, which is equidistant from the centers of the outlets 4 and 5. An example is shown in FIGS. 10 to 14.

Figure 10:
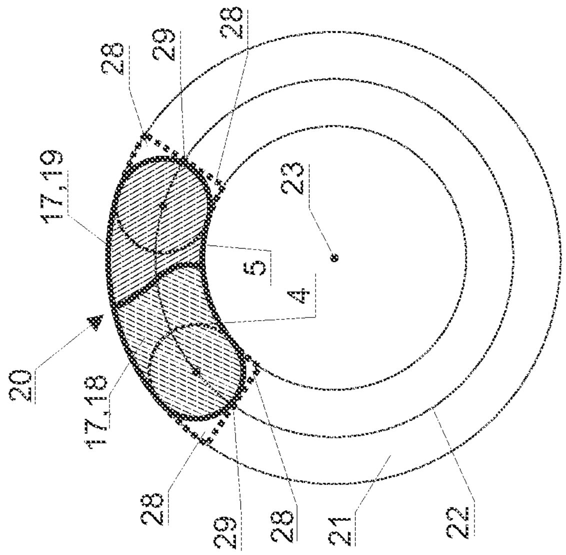
FIG. 10 shows an example of configuring the overlapping areas 18 and 19 for the shutter 11, which are rotated from one end position to another one around the axis with a projection at point 23.

FIG. 10 shows an example of configuration of overlapping areas 18 and 19 for the outlets 4 and 5, which complement each other up to the ring 21 segment 20 having width equal to 2R. The central line 22 of the ring passes through the projections of the centers of the outlets 4 and 5, and the center of the ring coincides with the projection of the pivot axis of the shutter 11, not shown in this figure.

Figure 12:
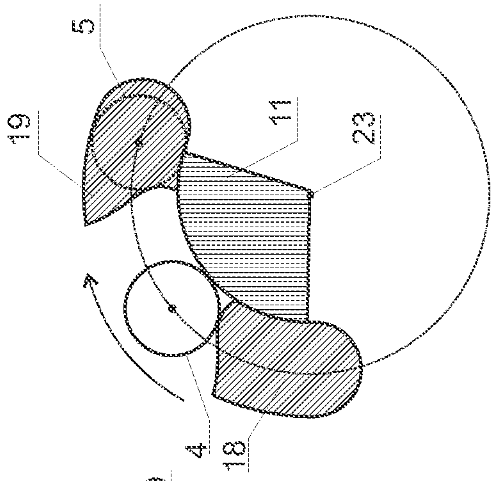
Figure 11:
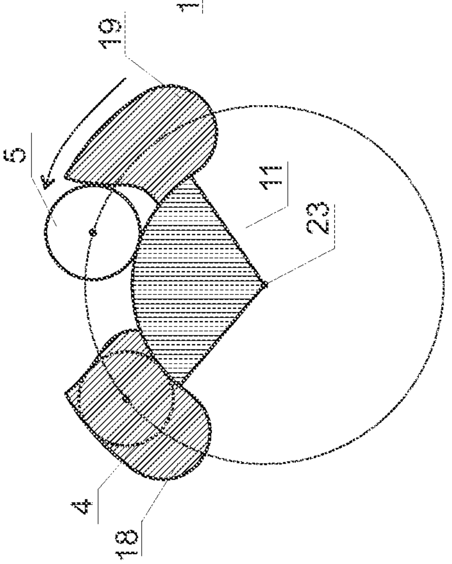
In FIG. 11, the shutter 11 is in the closed position, and in FIG. 12—in the open position.

FIG. 11 shows an example of the configuration of the shutter 11 with the projection of the pivot axis at point 23. The shutter 11 includes two overlapping areas 18 and 19, the formation of which is shown in FIG. 10 and which correspond to the outlets 4 and 5, and are in a closed position, since the overlapping areas 18 completely covers the lumen of the corresponding outlet 4. In FIG. 12, the same shutter 11 is in the open position, since the overlapping area 19 completely covers the lumen of the corresponding outlet 5.

Figure 14:
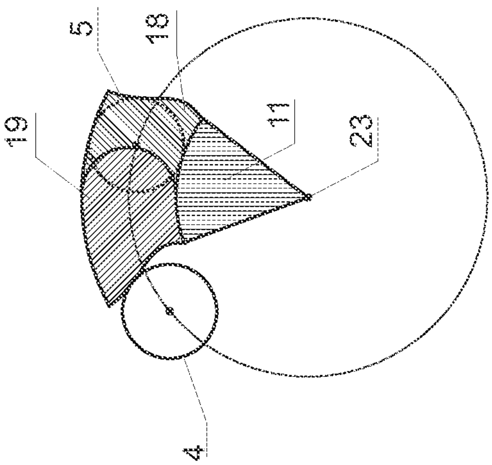
Figure 13:
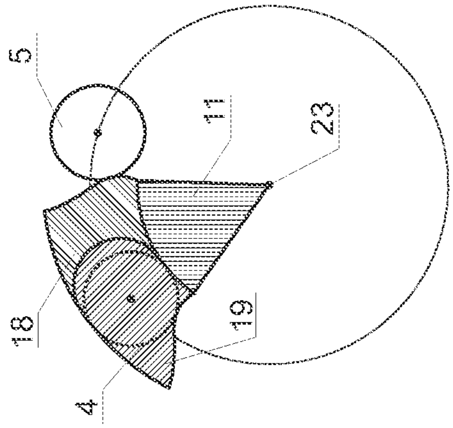
In FIG. 13, the shutter 11 is in the closed position, and in FIG. 14—in the open position.

FIG. 13 shows an example of an alternative configuration of the shutter 11 with the projection of the pivot axis at point 23. The shutter 11 includes same two overlapping areas 18 and 19, the formation of which is shown in FIG. 10 and which now correspond to the outlets 5 and 4, and are in a closed position, since the overlapping areas 19 completely covers the lumen of the corresponding outlet 4. In FIG. 14, the same shutter 11 is in the open position, since the overlapping area 18 completely covers the lumen of the corresponding outlet 5.

For the shutter 11, which performs only translational movement when moving from one end position to another one, the overlapping areas 17 have special shapes that exactly complement each other up to the strip 25 segment 24 with a width equal to 2R, a length of at least 4R, and the radius of rounded corners 28 of the segment 24 is equal to R.

Figure 15:
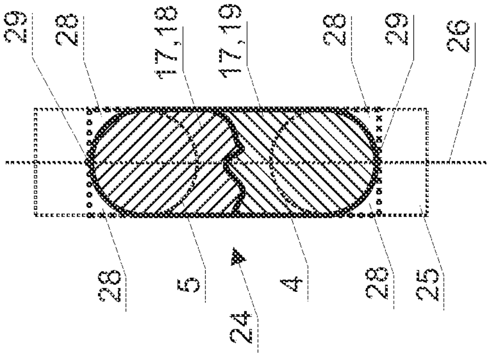
FIG. 15 shows an example of configuring the overlapping areas 18 and 19 for the shutter 11, which makes a translational movement when moving from one end position to another one.

FIG. 15 shows an example of configuration of overlapping areas 18 and 19 for the outlets 4 and 5, which complement each other up to the strip 25 segment 24 having width equal to 2R.

Figure 16:
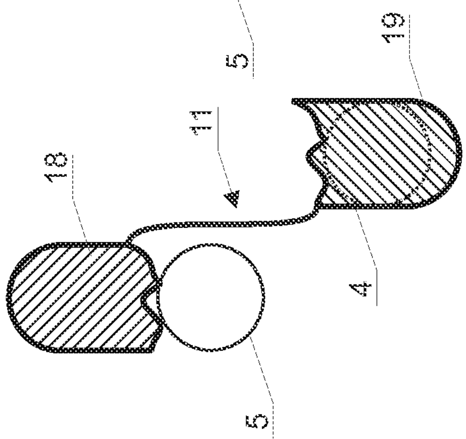
In FIG. 16, the shutter 11 is in the closed position, in FIG. 18—in the open position, and in FIG. 17—in a transitional position.
Figure 17:
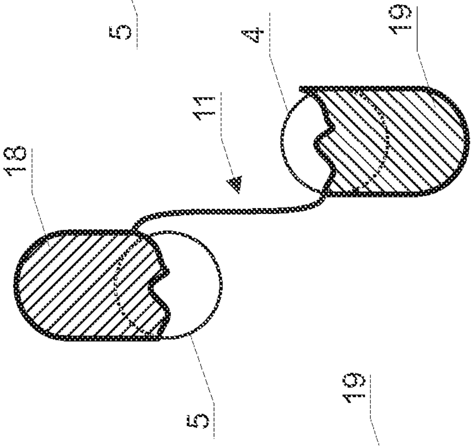
Figure 18:
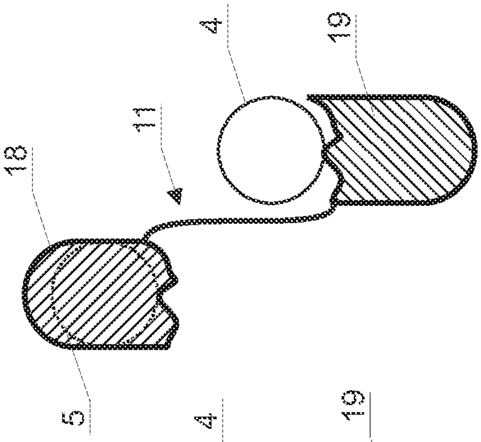

FIG. 16 shows an example of the configuration of the shutter 11, including two overlapping areas 18 and 19, the formation of which is shown in FIG. 15 and which correspond to the outlets 5 and 4, where the shutter is in the closed position, since the overlapping area 19 completely covers the lumen of the corresponding outlet 4. FIG. 18 shows the same shutter 11 in the open position, since the overlapping area 18 completely covers the lumen of the corresponding outlet 5, and FIG. 17 shows the intermediate position of the shutter 11.

Figure 19:
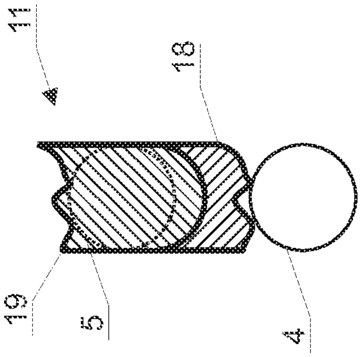
In FIG. 19, the shutter 11 is in the opened position, in FIG. 21—in the closed position, and in FIG. 17—in a transitional position.
Figure 20:
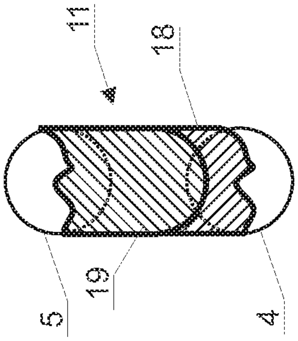
Figure 21:
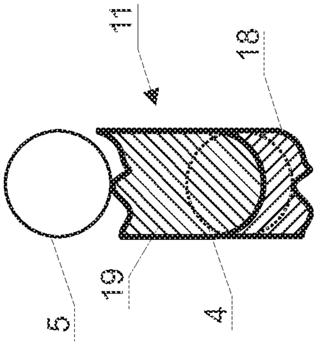

FIGS. 19 to 21 shows an alternative configuration example of the shutter 11, including the same two overlapping areas 18 and 19, the formation of which is shown in FIG. 15 and which now correspond to the outlets 4 and 5. In FIG. 19, the shutter 11 is in the open position, as the overlapping area 19 completely covers the lumen of the corresponding outlet 5, in FIG. 21, the same shutter 11 is in the closed position, since the overlapping area 18 completely covers the lumen of the corresponding outlet 4, and FIG. 20 shows an intermediate position of the shutter 11.

Figure 23:
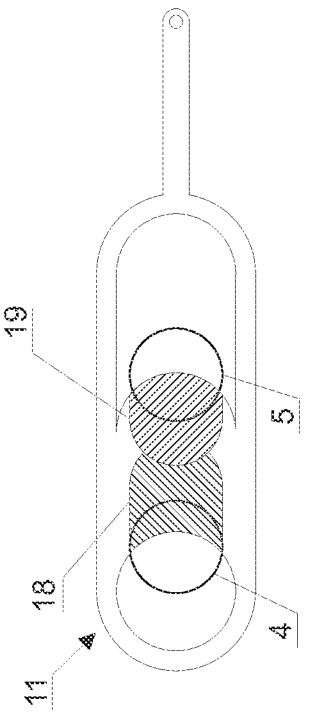
FIG. 23 shows an effective embodiment for configuring the shutter 11 using overlapping areas configured according to FIG. 22.
Figure 22:
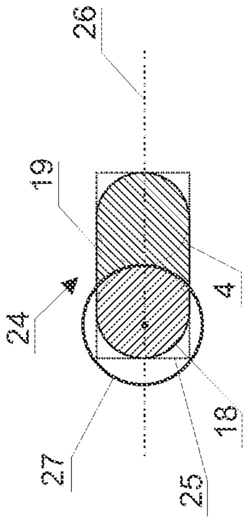
FIG. 22 shows an effective embodiment for configuring the working areas for a shutter that makes a translational movement when moving from one end position to another one.

FIG. 22 shows an effective embodiment of configuration of working areas 18 and 19 for the shutter that makes a translational movement when moving from one end position to another one. The strip 25 segment 24 as described above is cut by a secant circle 27, the center of which lies on the central line 26 of the strip 25, the diameter of the secant circle 27 is not less than 2R, the secant arc passes through the central line 26 no closer than 2R from each end of the central line of the segment 29. FIG. 23 shows an effective embodiment of configuration of shutter 11 with the overlapping areas 18 and 19, configured according to FIG. 22.

The generator 1 as described above is a device necessary for use in said method for a liquid jet formation and ejection, in which:

the hollow chamber 2 is made with outlet surface 3 distanced from the inlet 8 of the liquid 7, which, optimally, is made in the form of a flat removable lid;

a possibility is provided for forming two continuous jets 6, for which:

the hollow chamber 2 is provided with liquid 7 from a liquid source 9;

the outlet 3 of the hollow chamber 2 is equipped with two geometrically equal outlets 4 and 5, located adjacent to each other, optimally, in the central area of the outlet surface 3, and they are made round, conically expanding towards the outlet of the jet 6, and the conical narrowing of each of them facing into the chamber 2 forms a sharp edge 14 of the outlet;

the liquid turbulence is reduced and/or liquid flow is aligned inside the generator 1 between the liquid 7 inlet 8 into the chamber 2 and the jet 6 outlet from the outlets 4 and 5 on the outlet surface 3 of the chamber 2 by installing special means so that any path of the liquid 7 from the inlet 8 to each outlet 4 and 5 passes said means, optionally configured with the possibility of replacing them and/or cleaning from liquid residues, continuous, optimally, laminar, non-interfering jets 6 are formed at the outlets 4 and 5.

the chamber 2 is placed and oriented on its supporting basis, providing for positions in which the outlets 4 and 5 are located below the level of the liquid 7 inlet 8, for example, when the chamber 2 is oriented downwards with the outlets 4 and 5, and in the optimal embodiment, to drainage the liquid 7 to the liquid source 9, the outlets 4 and 5 are located above the maximum working level of the liquid 7 in the liquid source 9 with any placement and orientation of the chamber 2.

the outlet surface 3 of the hollow chamber 2 is equipped with the shutter 11, for which a rapid movement is provided from the end open position to the end closed position and back through a sequence of transitional positions in such a way that in the end open position a fully open lumen of the first outlet 4 and a fully closed lumen of the second outlet 5 is provided, in the end closed position a fully closed lumen of the first outlet 4 and a fully open lumen of the second outlet 5 is provided, and in each transitional position the lumens of both outlets 4 and 5 are partially open, and the total area of open lumens of the first 4 and second 5 outlets, which is equal to the lumen area of one of the fully open outlets 4 or 5;

the controlled drive 12 together with the coupler 13, each of which is optionally installed on the outlet surface 3, ensure the rapid movement of the shutter 11 from one end position to another through a sequence of transitional positions when the control signal the controlled drive 12 is given or stopped to.

The outlet surface 3 of the chamber 2, which in some embodiments of the method is performed perpendicular to the liquid flow in the hollow chamber 2, is equipped from the outside with the means 15 of liquid drainage ejected from the second outlet 5 in an open or any transitional position, in a direction other than the direction of liquid jet 6 ejection from the first outlet 4 in an open position, which, in the optimal embodiment, are performed in the form of a junction pipe 15, the internal section of which completely includes the section of the second outlet 5, and which is hermetically connected to the second outlet 5 from the outside of the outlet surface 3 of the chamber 2; wherein the drained liquid and the junction pipe 15 do not interfere with the ejected liquid jet 6 from the first outlet 4 in the open position.

In one of the optimal embodiments, the shutter 11, which ensures the constancy of the total area of the open lumens of the outlets 4 and 5, is performed in the form of a streamlined flat shutter 11 adjacent to and sliding along the inner side of the outlet surface of the chamber with a constant volume of its part immersed in liquid with two overlapping areas 18 and 19, directly partially or completely overlapping the corresponding outlets, one overlapping area 18 and 19 for each outlet 4 and 5, respectively, and each overlapping area 18 (19) corresponds to a continuous area on the shutter 11, providing a completely open lumen of the corresponding outlet 4 (5) in one end position of the shutter and the fully closed lumen of the same outlet 4 (5) in the other end position of the shutter.

The shutter 11 for the transition from one end position to another one is configured by translational motion in such a way that the overlapping areas 18 and 19 form a special shape of two complementary fragments of the segment 24 of a continuous strip 25 with rounded corners 28.

The shutter 11 for the transition from one end position to another one by pivoting around the axis 23 equidistant from the centers of the outlets 4 and 5 is configured in such a way that the overlapping areas 18 and 19 form a special shape of two complementary fragments of the ring segment 20 of the ring 21 with rounded corners 28, where the ring segment 20 is circumscribed around the projections of both outlets 4 and 5.

The shutter 11 is configured on the basis of geometrically intersecting overlapping areas 18 and 19, and these overlapping areas 18 and 19 are superimposed at their geometric intersection and further moved forward relative to each other to a position in which the edges formed by a secant, for example, the circle 28, as in FIG. 22 and FIG. 23, forming complementary fragments of the segment 24 of the continuous strip 25, as shown in FIG. 15, or the ring segment 20 of the ring 21, as shown in FIG. 10, are lateral.

The simulation showed that when using the latter type of shutter, the liquid jet remains continuous when more than 50% of the lumen area is overlapped, which was an unexpected result. Since when overlapping with the shutter with a straight edge (such as the letter "D" or a rectangle "□"), the jet loses continuity (ceases to be continuous) already when 30-35% of the area is overlapped, which requires a corresponding increase in the switching speed.

It should be noted that the proposed technical solution is designed to be well combined with the invention "Method for delivering liquid by ejecting a continuous jet and system for implementing said method", which is the subject of separate parallel application by the same Applicant (Lithuanian priority application LT2021 511).

Specific examples of the embodiments of above disclosed method and both devices explain the invention, but do not limit the scope of protection.

Example 1

As the chamber 2 a hollow cylinder is used, for example, made of a carbon fiber composite, with diameter from 80 mm to 150 mm, optimally 100 mm, and length from 100 mm to 200 mm, optimally 150 mm. The outlet surface 3 is made of stainless steel sheet with thickness of 0.2 mm to 0.5 mm, optimally 0.3 mm. The outlet surface 3 corresponds to the inner surface of the removable lid, and the liquid inlet is made tangential on the side surface near the end face opposite to the removable lid. The means 10 for reducing liquid turbulence include two parts—a sponge material with open pores from 20 mm to 40 mm thick, optimally 30 mm, filling the entire section of the chamber immediately after the inlet, and a sequence of 3 to 5, optimally 4 mesh filters with small cells (from 0.1 mm to 0.5 mm, optimally 0.2 mm), curved by a hemisphere axially towards the liquid inlet, spaced 15 mm apart and with diameter equal to the inner section of the cylinder. The outlets 4, 5 have diameter from 6.5 mm to 10 mm, optimally, 7 mm, and allow to generate high-quality laminar jets. The shutter 11 is adjacent to the inner side of the outlet surface 3 and is made of stainless steel sheet with thickness of 0.05 to 0.5 mm, optimally, 0.1 mm and has a configuration as shown in FIGS. 7 to 9, 22 and 23. The shutter is driven by a single solenoid, the core of which includes a permanent neodymium magnet, and controlled by passing a direct current through it, and the direction of the current determines the direction of the transition of the shutter. The generator 1 is made with a drainage pipe 15. This design of the generator provides throughput capacity of up to 9 L/min and accurate ejection of liquid doses from 5 ml.

Example 2

An alternative working embodiment of the generator 1 for ejection of continuous, but not laminar jets is based on a hollow cylindrical chamber 2, with diameter from 5 mm to 20 mm, optimally 15 mm, and length from 40 mm to 100 mm, optimally 50 mm. The outlet surface 3 is made of stainless steel sheet with thickness of 0.2 mm to 0.5 mm, optimally 0.3 mm. The outlet surface corresponds to the inner surface of the removable lid, and the liquid inlet 8 is made axial on the opposite end of the removable lid. The means 10 for aligning liquid flow include a honeycomb tubular structure filling ⅔ of the cylinder height, with a free area in front of the outlet surface 3 with height of ⅙ of the cylinder height. The outlets 4, 5 have diameter from 1 mm to 4 mm, optimally, 3 mm, and allow to generate high-quality continuous jets. The shutter 11 is adjacent to the inner side of the outlet surface 3 and is made of stainless steel sheet with thickness of 0.05 to 0.5 mm, optimally, 0.1 mm and has a configuration as shown in FIGS. 7 to 9, 22 and 23. The shutter 11 is driven by a single solenoid, the core of which includes a permanent neodymium magnet, and controlled by passing a direct current through it, and the direction of the current determines the direction of the transition of the shutter. This design of the generator 1 provides throughput capacity of up to 6 L/min and accurate ejection of liquid doses from 2 ml.

The advantages of the method and devices as described are:
- ejection of jet with the specified characteristics without transient process;
- minimal fluctuations of liquid pressure during a transit of the shutter from one end position to another ensure the integrity of the ends of the continuous jet;
- accurate ejection of small doses of liquid;
- minimal or no losses of liquid outside its ballistic trajectory;
- easy maintenance; and
- high compatibility of the solution with various specific applications.

INDUSTRIAL APPLICABILITY

The proposed technical solution can be used in agriculture, animal husbandry, and in other industrial fields where there is a demand on targeted delivery of doses of any liquid products without the formation of aerosols or sprays, namely by the ejection of directed free continuous jets.

The main application is the use of devices, according to the proposed solution, as a controlled generator of continuous, for example laminar, jets in systems of targeted delivery of liquid doses in agriculture and animal husbandry. Also, the proposed method and device can be used in public water and entertainment installations, for example, fountains, active games and amusement parks.

LIST OF POSITIONS

1 Generator for formation and controlled ejection of liquid jet
2 Hollow chamber
3 Outlet surface
4 First outlet
5 Second outlet
6 Continuous liquid jet
7 Liquid
8 Liquid inlet into generator chamber
9 Source of liquid
10 Means for reducing turbulence and/or aligning liquid flow
11 Shut-off means/Shutter
12 Controlled drive
13 Coupler
14 Sharp edge of the outlet
15 Means for liquid drainage, such as junction pipe
16 Junction of the coupler with the shutter
17 Shutter's overlapping area
18 Overlapping area for one outlet
19 Overlapping area for another outlet
20 Ring segment formed by overlapping areas
21 Ring
22 Ring center line going through the centers of outlets
23 Projection of shutter pivot axis coinciding with the center of the ring
24 Strip segment
25 Strip
26 Strip center line
27 Secant circle
28 Rounded corner of strip segment or ring segment
29 End of strip segment center line or ring segment center line

The invention claimed is:

1. A continuous liquid jet generator, comprising:
a chamber configured to receive a liquid under pressure;
a liquid inlet in fluid communication with the chamber;
an outlet surface of the chamber spaced from the liquid inlet;
first and second outlets formed in the outlet surface, the first and second outlets being adjacent to one another and having equal cross-sectional flow areas;
a shutter positioned adjacent to the outlet surface and movable relative thereto between a first end position, a second end position, and intermediate positions;
wherein, in the first end position, the shutter fully opens the first outlet and fully closes the second outlet;
wherein, in the second end position, the shutter fully opens the second outlet and fully closes the first outlet;
wherein, in each intermediate position, the shutter partially opens both the first outlet and the second outlet;
wherein a combined open flow area of the first and second outlets remains substantially constant across the first end position, the second end position, and the intermediate positions; and
an actuator coupled to the shutter and configured to move the shutter between the first end position and the second end position.

2. The continuous liquid jet generator of claim 1, further comprising a flow conditioning structure positioned within the chamber between the liquid inlet and the outlet surface, the flow conditioning structure being configured to reduce turbulence and align liquid flow toward the first and second outlets.

3. The continuous liquid jet generator of claim 1, wherein each of the first and second outlets includes a converging inlet section and a diverging outlet section forming a sharp edge at the outlet surface.

4. The continuous liquid jet generator of claim 1, further comprising a drain conduit coupled to the second outlet on an exterior side of the outlet surface and configured to divert liquid discharged from the second outlet when the second outlet is not fully open.

5. The continuous liquid jet generator of claim 1, wherein the shutter is movable by translational motion parallel to the outlet surface.

6. The continuous liquid jet generator of claim 1, wherein the shutter is movable by rotational motion about an axis located between the first and second outlets.

7. The continuous liquid jet generator of claim 1, further comprising a support structure configured to hold the chamber in an orientation in which the outlet surface is exposed to ambient air during operation.

8. The continuous liquid jet generator of claim 1, wherein maintaining the combined open flow area substantially constant reduces pressure fluctuations within the chamber during movement of the shutter.

9. The continuous liquid jet generator of claim 1, wherein the outlet surface is formed as a removable cover of the chamber.

10. The continuous liquid jet generator of claim 2, wherein the flow conditioning structure is positioned such that all liquid flow paths from the liquid inlet to the first and second outlets pass through the flow conditioning structure.

11. The continuous liquid jet generator of claim 1, wherein the first and second outlets are symmetrically arranged about a plane passing through a center of the outlet surface.

12. The continuous liquid jet generator of claim 4, wherein the drain conduit is oriented so as not to intersect a trajectory of a liquid jet discharged from the other outlet.

13. The continuous liquid jet generator of claim 5, wherein the shutter moves linearly along a surface of the outlet surface.

14. The continuous liquid jet generator of claim 6, wherein the shutter rotates about a fixed axis parallel to the outlet surface.

15. The continuous liquid jet generator of claim 8, wherein maintaining the combined open flow area substantially constant reduces transient pressure variations within the chamber during shutter movement.

16. The continuous liquid jet generator of claim 1, wherein the chamber is supported such that the outlet surface is positioned below the liquid inlet.

17. A method of generating a continuous liquid jet, comprising:
supplying a liquid to a chamber through a liquid inlet;
directing the liquid toward first and second adjacent outlets formed in an outlet surface of the chamber;

moving a shutter between a first end position and a second end position while maintaining a substantially constant combined open flow area of the first and second outlets; and ejecting continuous liquid jets from the first outlet and the second outlet in accordance with the position of the shutter.

18. The continuous liquid jet generator of claim 1, wherein the shutter comprises a shutter plate having an elongated opening, and the shutter plate is movable by translation relative to the outlet surface such that the elongated opening is aligned with the first outlet in the first end position and aligned with the second outlet in the second end position, and overlaps both outlets in each intermediate position.

19. The continuous liquid jet generator of claim 1, wherein the shutter is a rotary shutter configured to rotate about an axis between the first end position and the second end position, the rotary shutter having first and second overlapping areas of complementary shapes that, during rotation of the rotary shutter between the first end position and the second end position, progressively cover the first outlet and progressively uncover the second outlet, such that an open area of the first outlet decreases while an open area of the second outlet increases, and a combined open flow area of the first outlet and the second outlet remains substantially constant.

20. The continuous liquid jet generator of claim 19, wherein the first overlapping area and the second overlapping area have complementary curved shapes that together define a ring-segment-shaped region, and wherein a central portion of the ring-segment-shaped region follows an arc centered on the pivot axis of the rotary shutter, the pivot axis being positioned substantially equidistant from respective centers of the first outlet and the second outlet.

* * * * *